United States Patent Office 3,328,590
Patented June 27, 1967

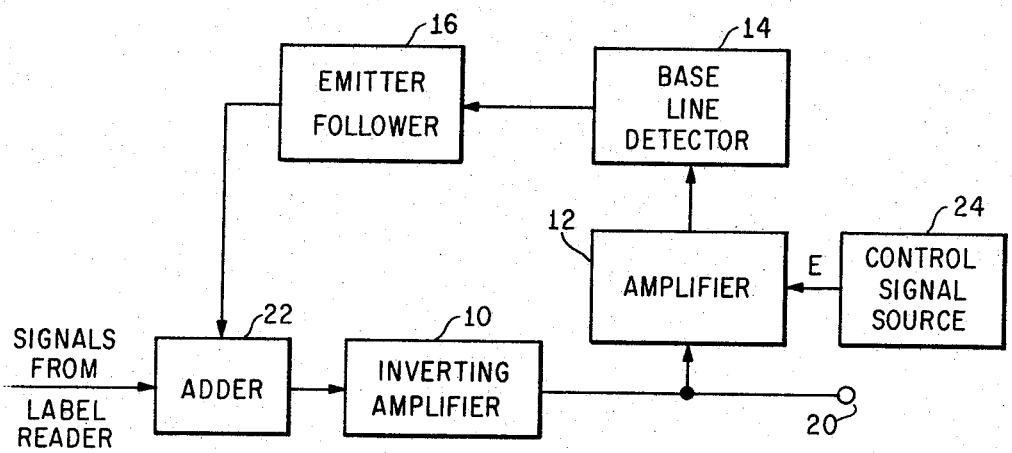
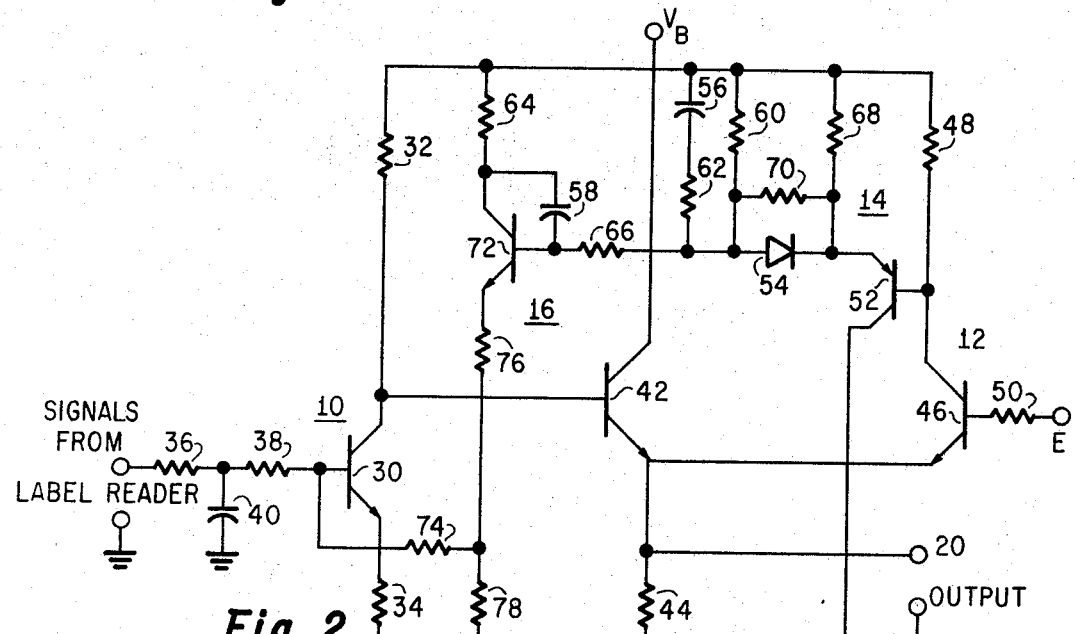
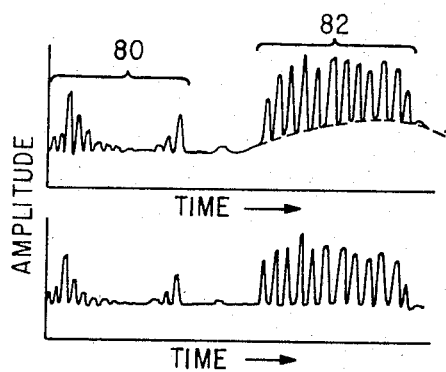
INVENTOR.
CHRISTOS B. KAPSAMBELIS
BY *Spencer E. Olson*
ATTORNEY

3,328,590
AUTOMATIC GAIN CONTROL FOR AMBIENT LIGHT EFFECTS
Christos B. Kapsambelis, Waltham, Mass., assignor to Sylvania Electric Products Inc., a corporation of Delaware
Filed Dec. 11, 1963, Ser. No. 329,805
6 Claims. (Cl. 250—219)

This invention relates to electronic circuits and more particularly, to direct current restoration circuits especially useful in electro-optical mark sensing systems.

Direct current restoration circuits have wide applicabilty in situations where a signal must be clamped to ground or to a specified direct current level. A particular application in which such circuits are especially useful is in an electro-optical mark sensing system, for example, in a label reading system for identifying railroad cars or other vehicles, of the type described in copending application S.N. 137,918, filed Sept. 13, 1961, now Patent No. 3,225,177 and assigned to the assignee of the present application. The significance of the instant invention will be better appreciated after consideration of the label reading system described in detail in the aforementioned copending application; it will be briefly discussed here to the extent necessary for an understanding of the present invention.

Briefly, the system includes a trackside optical reading unit which reads a coded label affixed to the side of a railroad car, or other vehicle, and translates the coded information into car identification numbers or other data contained in the code. The labels are fabricated from colored stripes of retro-reflective material which, as is well known, reflects an incident light beam back along the path of incidence. The labels are suitably coded in a two position base four code, by various two-stripe combinations of orange, blue, white and black stripes of retro-reflective material, to represent start and stop signals and the decimal digits one through zero, and are mounted in a vertical array of horizontally oriented stripes on the side of the vehicle.

The trackside unit includes a source of light and a rotating drum with a plurality of mirrors mounted around its periphery. As the drum rotates, the mirrors cause a light beam to vertically scan the label and the light reflected from the label is divided by a dichroic optical system into orange and blue light which is applied to respective sensors whose output signals are processed to provide the requisite decoded information. The signals appearing at the output of the sensors are coded pulses representative of the particular label digits read by the scanner.

In practice, the label reading system must operate under varying climatic conditions which cause wide variations in the ambient light received by the sensors; factors affecting the ambient light are the varying brightness of the day, reflections from snow and rain, and the color of foliage and objects within "view" of the trackside unit. In addition, reflections from the side of the vehicle received by the sensors may vary appreciably in intensity due to different surface reflectivities of the side of the vehicle from day to day, or from one vehicle to the next. For example, reflections from a stainless steel passenger car would obviously be more intense than from a faded rust-colored freight car. Furthermore, the side of the vehicle, be it a railroad car, a bus, or a truck, is often covered with dirt and grime which also affects the surface reflectivity. The output voltage of the sensors varies in accordance with the amount of ambient light received thereby, as well as with signal light reflected from the scanned label. Accordingly, the output voltage of the sensors appears as a varying DC level added to the signal pulses caused by the light reflected from the label. It has been observed that the amplitude of this DC level or base line may vary over a range of 10:1 or more. Further processing of the coded pulses is made extremely difficult, if not completely impractical, by the presence of this widely varying base line.

In order to expeditiously process the pulse information, all of the pulses should originate from a base line which is maintained at a substantially constant level. Accordingly, it is a primary object of the present invention to provide circuitry for removing the varying base line due to ambient reflections so that the pulse signals from the label all rise from a single DC level. Another object of the invention is to provide a DC restoration circuit having improved dynamic range and fidelity.

Briefly, according to the present invention, the variable base line is removed and the signal pulses restored to a constant level by a circuit in which DC restoration is accomplished by a negative feedback technique. In essence, the base line variation of a received signal is detected, and an inverted version of the detected base line component fed back to the input of the circuit, whereby the varying base line component is canceled causing the signal pulses to appear at the circuit output at a constant level. The pulses thus restored are then in suitable condition for subsequent signal processing necessary to decode the information read from the label. A significant feature of the present invention is that the signal pulses are not appreciably distorted after restoration, as they often are in conventional DC restorers. Furthermore, in contrast to known circuits, the present invention has a greater dynamic range, restoration over a 100:1 range being easily achieved.

Other objects, features, and advantages of the invention will be more apparent from the following detailed description, taken in conjunction with the drawing, in which:

FIG. 1 is a block diagram of a preferred embodiment of the invention;

FIG. 2 is a schematic circuit diagram of a preferred embodiment of the invention; and FIGS. 3A and 3B are curves illustrating the performance of the circuit of FIG. 2.

Referring now to FIG. 1, the signals which are to be restored to a constant level, such as from the label reader described hereinabove, which include coded pulses representatives of the scanned information together with the varying DC level due to background light received by the sensors, are applied through an adder 22 to an inverting amplifier 10, the output of which is 180° out of phase with respect to the input signal. The output of amplifier 10 is applied to a second amplifier 12, to which is also applied a control signal E, which is derived from the DC level of the signals from the label reader; the source of the control signal is illustrated as block 24, which can be an adjustable resistive voltage divider connected to a source of label reader signals. Controls signal E is of suitable amplitude to bias amplifier 12 that only the base line region of the signal is amplified. In addition, the control signal E adjusts the quiescent operating level of the feedback signal and hence the DC level of the output signal. The output of amplifier 12 is applied to a base line detector circuit 14, which detects the envelope of the amplifier base line variations of the signal. The detected base line signal is applied to the input of the inverting amplifier 10 through an emitter follower 16 and an adder 22. Since the feedback signal is 180° out of phase with respect to the input signal from the label reader, the base line component is canceled in adder 22, and an output signal which consists of pulses at a constant level appears at output terminals 20. Direct current restoration is, therefore, accomplished by utilizing a negative feedback technique, the restored signal thus produced being a relatively undistorted replica of the information pulses. The circuit has a wide dynamic range, of the order of 100:1 which is far greater than that of previously known circuits. It is to be understood that the block diagram of FIG. 1 is merely exemplary of the instant invention, as other ways of providing negative feedback to accomplish the desired result will now occur to those skilled in the art. For example, amplifier 10 can be of the non-inverting type, with phase inversion provided by suitable means in the feedback loop.

FIG. 2 is a schematic diagram of a practical circuit embodying the concepts described in connection with the block diagram of FIG. 1, and includes an inverting amplifier 10 consisting of a transistor 30 having its collector connected through a load resistor 32 to a source of positive potential, represented by the terminal labeled $V_B$, and its emitter connected through resistor 34 to a source of negative potential, indicated at $V_C$. Resistor 34 provides degneration to stabilize the operation of transistor 30. The input signal is applied to the base of transistor 30 through series-connected resistors 36 and 38, a capacitor 40 being connected from the junction of these resistors to ground to by-pass high frequency components, such as noise, of the input signal.

The output of the amplifier, derived from the collector of transistor 30, is applied to the base of transistor 42, connected as an emitter follower, the collector of which is connected to $V_B$ and its emitter connected through resistor 44 to $V_C$. The emitter of transistor 42, which is also the output terminal 20 of the circuit, is connected to the emitter of transistor 46, the active element of amplifier 12. The collector of transistor 46 is connected through load resistor 48 to $V_B$ and its emitter load is common with that of transistor 42. A direct current control signal E having the characteristics described earlier is applied to the base of transistor 46 through resistor 50.

The output of amplifier 12, derived from the collector of transistor 46, is applied through a second emitter follower, including transistor 52, to the base line detector circuit 12. The detector circuit includes a diode 54, a pair of capacitors 56 and 58, and resistors 60, 62, 64 and 66. The diode is suitably biased by the voltage divider action of resistors 60, 68 and 70. The signal detected by circuit 14 is applied through another emitter follower 16, including transistor 72, to the input of amplifier 10 via resistor 74. Resistors 76 and 78 provide the emitter load for transistor 72, and act as a voltage divider from which the negative feedback signal is derived. Resistor 64 provides feedback to stabilize the operation of transistor 72.

In operation, negative-going pulses from the label reader are applied through resistors 36 and 38 to the base of transistor 30, causing positive-going signals to appear at the collector of transistor 30 and at the emitter of transistor 42. This signal is applied to the emitter of transistor 46, causing an amplified output signal to appear at the collector of transistor 46 for application to the base of the emitter follower transistor 52. A control signal E, which is related to the DC level of the input signals, is applied through resistor 50 to the base of transistor 46, the magnitude of this control signal being chosen to adjust the bias of the transistor such that amplifier 12 is operative only in the region of the base line signal. Transistor 46 functions as a high gain amplifier to amplify the base line region of the signal, and is biased such that it cuts off in the presence of large signals; therefore, the amplified signal appearing at the collector is clipped so that the signal appears as an amplified base line component having clipped signal pulses "riding" thereon. This amplified base signal is applied, via emitter follower 52, to the diode detector 14 which detects the relatively slowly varying base line component of the signal. Detection is accomplished in a well known manner; capacitors 56 and 58 retain a charge related to the level of the signal; however, this charge cannot vary at a sufficiently high rate to follow the high frequency variations of the signal pulses because of the decay time of the filter network formed by capacitors 56 and 58 and resistors 60, 62 64 and 66. Consequently, only the slower base line variations are reproduced at the detector output. Capacitance values are chosen to provide the requisite signal detection with minimum distortion.

The detected signal is applied to the base of transistor 72 in emitter follower 16, and the output signal appearing at the emitter thereof is applied as a feedback signal via resistor 74 to the base of transistor 30. It will be apparent that resistors 36, 38 and 74 perform the function of the adder network 22 of FIG. 1. By virtue of the negative feedback, and the biasing of amplifier 12, the signal appearing at the output terminal 20 consists of only the pulse information in the input signal clamped to a substantially constant datum level.

An operative embodiment of the circuit illustrated in FIG. 2 has been constructed and successfully operated with the following component values:

| | | |
|---|---|---|
| Resistors 36 and 38 | ohms | 10,000 |
| Resistor 34 | do | 100 |
| Resistors 76 and 78 | do | 5,100 |
| Resistor 44 | do | 390 |
| Resistor 74 | do | 3,600 |
| Resistor 32 | do | 750 |
| Resistor 64 | do | 330 |
| Resistor 66 | do | 1,500 |
| Resistor 62 | do | 75 |
| Resistor 60 | do | 51,000 |
| Resistor 68 | do | 1,000 |
| Resistors 48 and 70 | do | 15,000 |
| Resistor 50 | do | 510 |
| Capacitor 40 | mmf | 470 |
| Capacitors 56 and 58 | mf | 0.1 |
| Transistors 30, 42, 46 and 72 | | 2N1959 |
| Transistor 52 | | 2N1991 |
| Diode 54 | | 1N277 |

This circuit was operated with a voltage $V_B$ of +12 volts, and a voltage $V_C$ of −12 volts. DC restoration with substantially no distortion of the pulse information was provided with signal amplitudes extending over a range of 0.1 to 11 volts, with DC level variations having slopes from about 0 to 4 volts/millisecond. DC level slopes up to approximately 7 volts/millisecond have been processed with about 50% distortion in the output waveform; however, even with distortion of this magnitude the subsequent circuitry in the above-described label reading system is capable of deriving the desired data.

The efficacy of the circuit in providing DC restoration without distortion of the pulse signals is graphically shown in the curves of FIGS. 3A and 3B which are respectively waveforms of the signal from the label reader without and with processing of the signal by the circuit of FIG. 2. While the circuit of FIG. 2 is designed and has been described as accepting negative-going signals, for ease in comparing the waveforms before and after DC restoration, the curves have been inverted. In FIG. 3A, the group of pulses indicated at 80 are representative of signals derived from a coded label in the absence of variations in background reflections. The unequal amplitudes of the pulses is characteristic of a dirty or otherwise deteriorated label, and the relatively level base line would occur if the label were affixed to a background from which reflections are substantially uniform. It will be evident that DC restoration is not a problem with this group of pulses; however, in a practical system, these pulses must be processed with a minimum of distortion by the circuitry provided for those signals requiring DC restoration, such as the group of pulses indicated at 82. This portion of the waveform is typical of the signal derived from a new, clean and hence, highly retro-reflective label under conditions of high ambient light; e.g., a bright sunny day and the label affixed to a shiny stainless steel railroad car. Here, the coded pulse signals are of relatively uniform shape, but "ride" on the relatively slowly varying base line 84 because of the background light "seen" by the label reader, as has been explained. It will be appreciated that under conditions of high background illumination and a somewhat deteriorated label, the pulses would be of relatively smaller amplitude than shown, but still subject to the varying base line. In the illustrated example, the signal pulses (in both groups) vary over a range of amplitudes of about 20:1, and the amplitude of the base line voltage varies over a range of about 10:1.

In spite of these wide variations in signal characteristics, it will be seen from FIG. 3B that the circuit of FIG. 2 is effective to process, essentially without distortion, the pulses 80 which require little or no DC restoration, and to remove the variation in the base line of the pulses 82 such that all the pulses originate from the same base level. The pulses in group 82 likewise are processed with little or no distortion in their shape or amplitude.

It will be apparent that applicant has provided an improved DC restoration circuit in which such restoration is achieved by means of negative feedback. Various changes and alternative implementations will now occur to those skilled in the art without departing from the true spirit and scope of the invention. Accordingly, it is not intended that the invention be limited to that which has been particularly shown and described, except as such limitations appear in the appended claims.

What is claimed is:

1. A circuit for processing a composite signal having signal pulses riding on a varying base line, said circuit comprising: means for inverting said signal pulses, means for amplifying the base line region of said inverted signal pulses, means for detecting the base line component of said inverted signal pulses, and means for adding said base line component to said signal pulses to thereby cancel said base line component.

2. A circuit for processing a composite signal having signal pulses riding on a varying base line, said circuit comprising: an inverting amplifier to which said signal pulses are applied and operative to invert said signal pulses, an amplifier operative to amplify substantially only the base line region of said inverted signal pulses, a detector operative in response to said amplified base line signal to produce a signal representative of said base line component but opposite in polarity to the base line component of said signal pulses, and an adder network for combining said inverted base line component with said signal pulses and operative to cancel the base line component of said signal pulses.

3. In an electro-optical label reading system including a label containing coded data, apparatus for optically scanning said label, and sensors operative in response to light from said label to produce signal pulses representative of said coded data, a DC restoration circuit for eliminating variations in the base line component of said signal pulses caused by variations in ambient light received by said sensors, said circuit comprising: an inverting amplifier operative in response to signal pulse from said sensors to produce an inverted version of said signal pulses, an amplifier operative in response to said inverted signal pulses and to a control signal proportional to the base line level of said signal pulses to produce a first signal related to said signal pulses and having an amplified base line region, a detector operative in response to said first signal to produce a second signal which is a replica of said base line component but of opposite polarity, and means for adding said inverted base line component to said signal pulses and operative to cancel said base line component.

4. In an electro-optical label reading system including a label containing coded data, apparatus for optically scanning said label, and sensors operative in response to light from said label to produce signal pulses representative of said coded data; a DC restoration circuit for eliminating variations in the DC level of said signal pulses caused by variations in ambient light received by said sensors, said circuit comprising: an inverting amplifier, means for applying to said inverting amplifier an input signal from the label reader, a second amplifier operative in response to the inverted signal from said inverting amplifier and to a control signal proportional to the base line level of said signal pulses to produce an amplified version of the base line region of said signal, a detector operative in response to said amplified base line signal to produce an inverted replica of said base line component, and means for adding said inverted base line signal to the signal applied to the input of said inverting amplifier.

5. In an electro-optical label reading system including a label containing coded data, apparatus for optically scanning said label, and sensors operative in response to light from said label to produce signal pulses representative of said coded data, a circuit for eliminating variations in the base line component of said signal pulses caused by variations in ambient light received by said sensors, said circuit comprising: an inverting transistor amplifier having an input terminal to which said signal pulses are applied and an output terminal, a first emitter follower, means connecting the output terminal of said inverting amplifier through said first emitter follower to a non-inverting transistor amplifier, means biasing said non-inverting amplifier to be operative in a region determined by the base line level of said signal pulses, means including a second emitter follower for applying the output of said non-inverting amplifier to a detector circuit, said detector circuit being operative to produce an inverted replica of the base line component of said signal pulses, and means including a third emitter follower connected between said detector and the input terminal of said inverting amplifier for adding the inverted replica of said base line component to said signal pulses thereby to cancel said variations in the base line component of said signal pulses.

6. In an electro-optical label reading system including a label containing coded data, apparatus for optically scanning said label, and a sensor operative in response to light from said label and received ambient light to produce signal pulses representative of said coded data superimposed on a relatively slowly varying base line component, a circuit for eliminating variations in the base line component of said signal pulses caused by variations in the ambient light received by said sensors, said circuit comprising: first and second transistors each having emitter, collector, and base electrodes, means for applying signal pulses from said sensor to the base electrode of said first transistor, a first emitter follower connected between the collector of said first transistor and the emitter of said second transistor, a detector for detecting the base line component of said signal pulses and having input and output terminals, a second emitter follower connected between the collector of said second transistor and the input terminal of said detector, a resistive adder network for deriving a feedback signal proportional to said base line component, a third emitter follower connected between the output terminal of said detector and said adder network, and coupling means coupling the output of said adder network to the base electrode of said first transistor.

References Cited

UNITED STATES PATENTS

| | | | |
|---|---|---|---|
| 3,023,368 | 2/1962 | Erath | 330—29 X |
| 3,145,291 | 8/1964 | Brainerd | 250—219 |
| 3,176,236 | 3/1965 | Abbott et al. | 330—29 X |
| 3,225,304 | 12/1965 | Richards | 330—29 X |
| 3,226,653 | 12/1965 | Miller | 330—29 X |

RALPH G. NILSON, *Primary Examiner.*

J. D. WALL, *Assistant Examiner.*